UNITED STATES PATENT OFFICE.

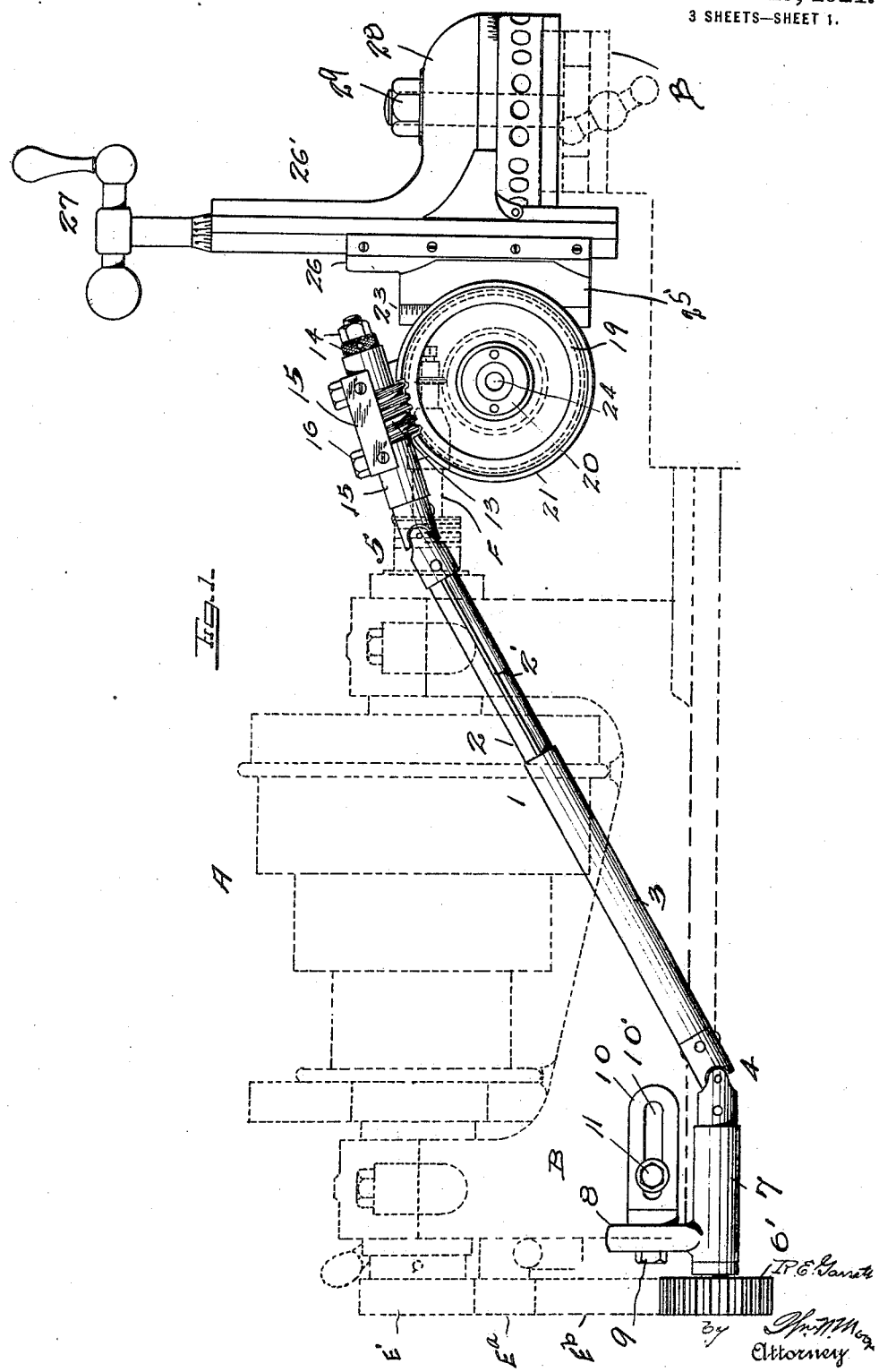

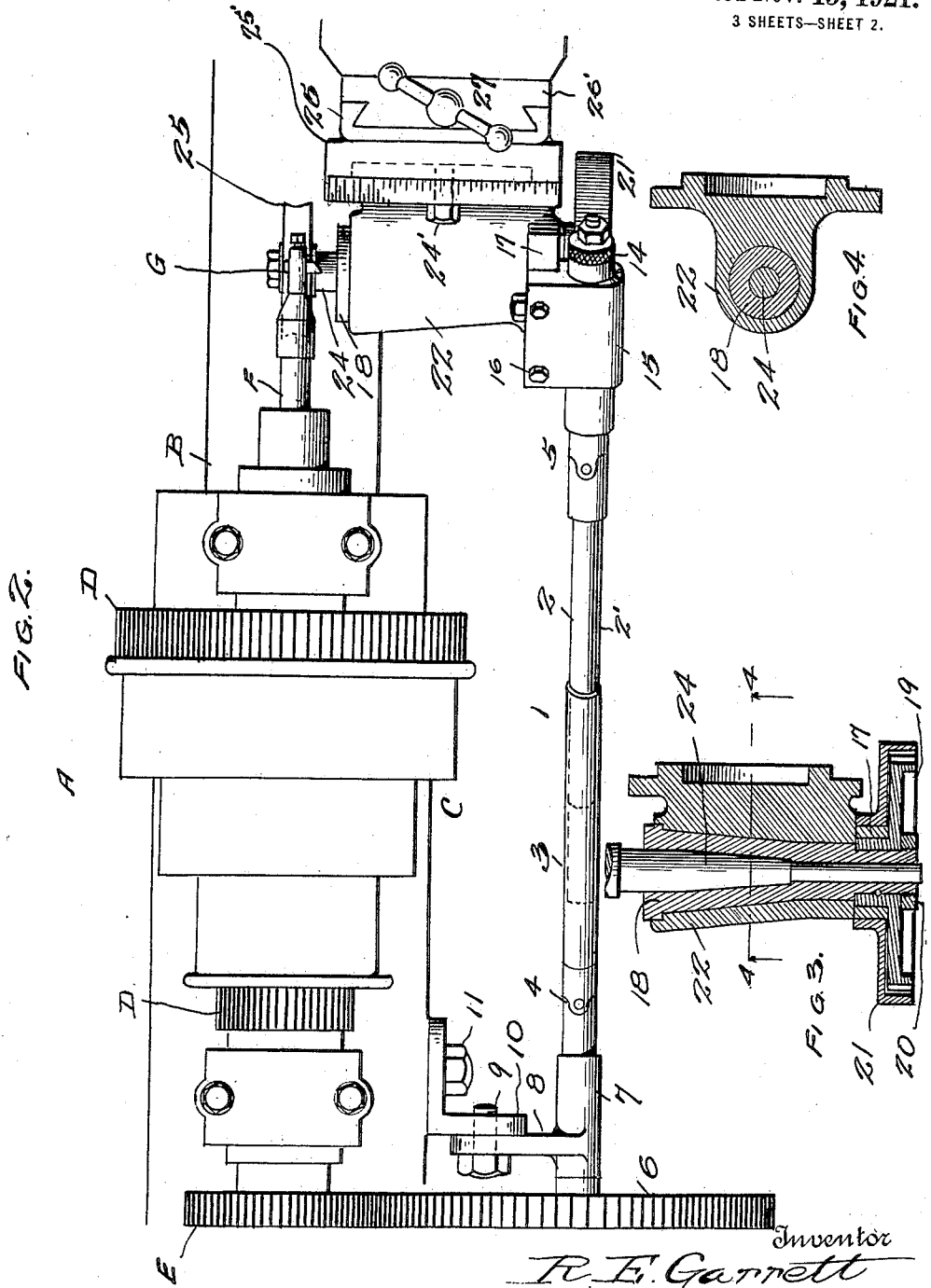

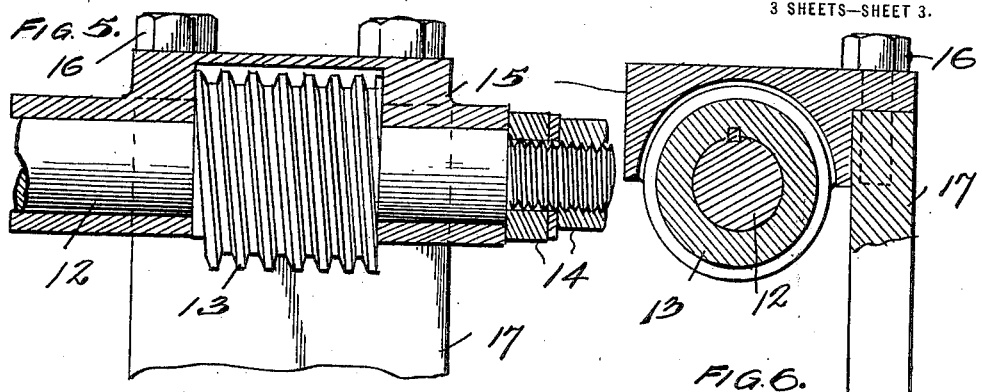
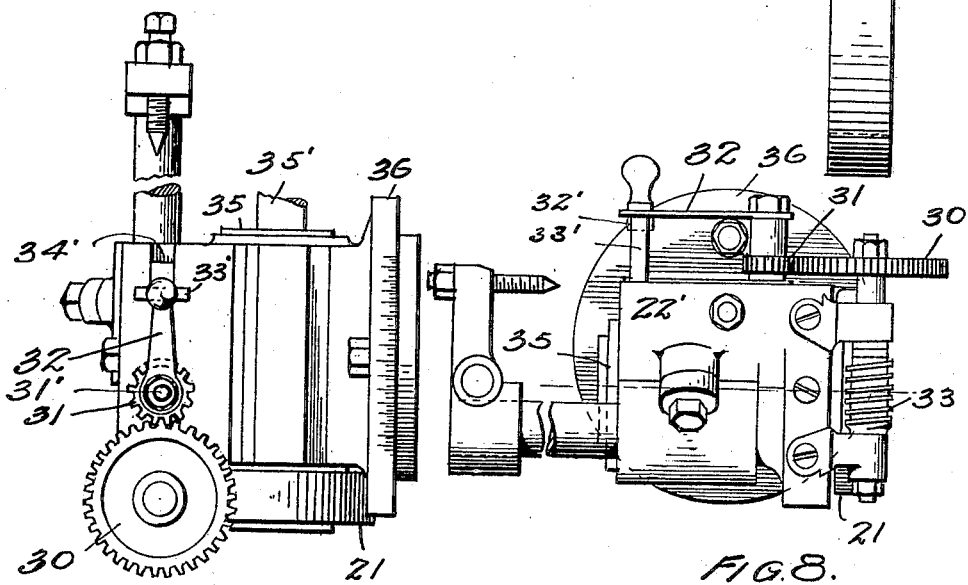

ROBERT E. GARRETT, OF NASHVILLE, TENNESSEE.

GEAR-CUTTING MACHINE.

1,397,372.  Specification of Letters Patent.  Patented Nov. 15, 1921.

Application filed May 10, 1917. Serial No. 167,681.

*To all whom it may concern:*

Be it known that I, ROBERT E. GARRETT, a citizen of the United States, residing at Nashville, in the county of Davidson and State of Tennessee, have invented certain new and useful Improvements in Gear-Cutting Machines, of which the following is a specification.

My present invention relates to an improved lathe attachment involving the combination and arrangement of devices for use in connection with the ordinary machinist's lathe head for semi-automatically hobbing worm wheels and for correctly and expeditiously cutting the same, as will be hereinafter indicated.

In the accompanying drawings I have illustrated one complete embodiment of my invention, together with a modified form or combination of elements, built according to the best modes I have so far devised for the practical application of the principles of my invention.

Figure 1 is a side elevation of my device in use as an attachment for a lathe for hobbing or cutting blank wheels to form worm wheels.

Fig. 2 is a top plan view of the mechanism of Fig. 1.

Fig. 3 is a sectional view through the spindle head and actuating worm wheel.

Fig. 4 is a transverse sectional view of Fig. 3, on line 4—4.

Fig. 5 is a sectional view of the bearing sleeve or journal for the actuating worm screw, and Fig. 6 is a transverse sectional view of the parts shown in Fig. 5.

Fig. 7 is a top plan view of a modified form of my attachment employing gears for indexing wheels for dividing the work or spacing the teeth on a gear which is being cut.

Fig. 8 is a side elevation of the device of Fig. 7 as seen from the left in said figure.

In the form of the invention depicted in Figs. 1 through 6, the device is semi-automatic in its operation and the indexing is accomplished from the lathe itself, which is indicated as a whole by the letter A and provided with the usual main frame B, driving pulleys C and gears D. A special pinion or gear wheel E may be used with the lathe which revolves with the shaft F which carries the tool or fly cutter G, which may be varied in accordance with the character of the work, and it will readily be seen that these parts are components of the ordinary lathe, with the exception of the special gear wheel E as stated before.

For the purpose of indexing or revolving the spacing device I employ in connection with the operating lathe, a sectional, telescopic, universally jointed shaft 1 which comprises a section as 2 provided with a feather or key 2' and adapted to telescope or slide within the tubular portion 3 of the shaft. The shaft is positioned at one side of the lathe, oblique to the operating shaft F, and is provided with a pair of universal joints 4 and 5 to allow for flexibility of the shaft 1.

In Fig. 2 a large gear wheel 6 is shown engaging the gear E and in Fig. 1 a smaller wheel 6' is indicated, to illustrate the changeability of the gears and it will of course be seen that the gears E on the lathe will be changeable, so that a great variety of numbers of teeth may be hobbed on the blank, indicated in Fig. 2 by the number 25.

At its lower end the obliquely arranged jointed shaft is supported or journaled in a sleeve 7 which is fashioned with an integral perforated bracket arm 8 for the bolt 9 which secures said arm to the bracket 10 which is of angular form and provided with an elongated slot 10'. By means of the adjusting bolt 11 in this slot 10' the supporting sleeve and bracket are attached to the frame of the lathe, thus providing a stable, fixed support for the shaft, and capable of adjustment to suit different conditions.

At its upper end the shaft 1 is provided with an extension 12 upon which the worm screw 13 is fixed, and by means of nuts 14 the shaft extension is held in its bearing sleeve or head 15 which forms a journal bearing for the shaft extension and a housing for the worm screw. The bearing head is supported on a plate to which it is fixed by the bolts 16, the plate being indicated by the number 17. The worm screw is designed to revolve the hollow tapering spindle 18 through the medium of the worm wheel 19 which is secured on the spindle by nut 20, and has a cover or shield 21 supported on the supporting plate or bracket 17. The hollow tapering spindle 18 is revoluble in the index head 22 having an index disk 23, and the mandrel 24 retained in the hollow spindle is adapted to hold the blank 25 before referred to. It will thus be seen that the worm wheel is revoluble in the end of the bracket 17 and the spindle is revoluble in the index head 22, when the wheel is driven by the worm screw 13.

The blank may be fed to and withdrawn from its tool by the action of the slide 26, whose apron 25' is attached to the index disk of the index head by means of the bolt 24', and operable through the feed screw device 27 of the main stand 26'. These parts are supported as usual on the lathe frame by means of the base 28 and securing bolt 29.

In operation, when the lathe is running the shaft 1 is driven through the medium of the interchangeable gears $E^e$ (or $E'$ $E^a$, $E^b$ and 6' in Fig. 1) so that the worm screw and worm gear or worm wheel revolve the spindle in order to slowly move the blank 25 the space of a tooth, and of course the relationship of the blank to the cutter G is controlled by the feed screw 27 as usual. In this manner the spacing movement of the blank is automatically accomplished through the interchangeable gears driven from the lathe and the sectional shaft and spindle.

In the modification of the invention as shown in Figs. 7 and 8 the indexing is accomplished, manually, through the medium of a pair of gears as 30, 31 which may be different sizes and are interchangeable, and are manipulated through the movement of an indexing lever 32 to revolve the worm screw 33 and through the medium of a worm wheel contained within the casing 21, and similar to the worm wheel 19 of the modification first mentioned, it operates the spindle 35, and with it the mandrel 35' upon which the blank is supported. In this form of the invention the spindle is supported in the head 22' and the disk 36 is integral with the head as in the preceding form of the invention.

The lever 32 may be retained in adjusted position by means of a sharpened lug 32' carried by a notched post 33'', said post being slidable in a groove 34', as seen in Fig. 7, so that the member 31' of the pinion 31 may be moved. By providing an attachment plate 17 in common for both the spindle-operating worm wheel, and the adjacent extremity of the flexible inclined shafting 1, 2, 3, the operating parts of the gear are always kept in engagement, and the different sections of the shafting are compelled to follow all the adjustments of the disk 23. The mandrel 24, 35' may be mounted and secured in the cavity of the spindle in the ordinary manner.

What I claim is:

1. In a machine of the class described, the combination with a cutter operating shaft, a cutter on said shaft and a work operating shaft associated with the cutter shaft, of an interposed obliquely arranged jointed shaft, said shaft being telescopic and universally jointed, an extension to the upper end of said obliquely arranged shaft, a worm screw fixed on said extension, a bearing sleeve for said extension, said bearing sleeve forming a journal bearing for said extension and a housing for the worm screw, a shield carried by the support of the bearing sleeve, a spindle, and an adjustable tail-stock confronting the work supporting end of the spindle.

2. In a machine of the class described, the combination with a cutter operating shaft, a cutter on said shaft and a work operating shaft associated with the cutter shaft, of an interposed obliquely arranged jointed shaft, said shaft being telescopic and universally jointed, an extension to the upper end of said obliquely arranged shaft, a worm screw fixed on said extension, a bearing sleeve for said extension, said bearing sleeve forming a journal bearing for said extension and a housing for the worm screw, a shield carried by the support of the bearing sleeve, means for adjusting the relative positions of the work spindle and the cutter, the same embodying a work rest in parallelism with the spindle.

In testimony whereof I affix my signature in the presence of two witnesses.

ROBERT E. GARRETT.

Witnesses:
 EDGAR DRAKE,
 E. J. PULLIN.